Feb. 16, 1943.  J. H. PRESSLEY  2,311,596
AUTOMATIC RECORD CHANGING APPARATUS
Filed Oct. 17, 1940   7 Sheets-Sheet 3

INVENTOR
JACKSON H. PRESSLEY
ATTORNEY

Feb. 16, 1943.    J. H. PRESSLEY    2,311,596
AUTOMATIC RECORD CHANGING APPARATUS
Filed Oct. 17, 1940    7 Sheets-Sheet 4

INVENTOR
JACKSON H. PRESSLEY
BY
ATTORNEY

Feb. 16, 1943.  J. H. PRESSLEY  2,311,596
AUTOMATIC RECORD CHANGING APPARATUS
Filed Oct. 17, 1940   7 Sheets-Sheet 5

INVENTOR
JACKSON H. PRESSLEY
BY
ATTORNEY

Feb. 16, 1943.  J. H. PRESSLEY  2,311,596
AUTOMATIC RECORD CHANGING APPARATUS
Filed Oct. 17, 1940  7 Sheets-Sheet 6

INVENTOR
JACKSON H. PRESSLEY
ATTORNEY

Patented Feb. 16, 1943

2,311,596

UNITED STATES PATENT OFFICE 2,311,596

AUTOMATIC RECORD-CHANGING APPARATUS

Jackson H. Pressley, Marion, Ind., assignor to Farnsworth Television and Radio Corporation, a corporation of Delaware Application October 17, 1940, Serial No. 361,472

9 Claims. (Cl. 274—10)

This invention relates to automatic record-changing apparatus and more particularly to improved mechanism in such apparatus for changing and reversing records.

An object of the present invention is to provide an improved and simplified mechanism for moving a record from a magazine to a turntable and for reversing a record on the turntable.

In accordance with the present invention, there is provided an automatic record-changing apparatus for an electric phonograph with a turntable. This record-changing apparatus comprises a pivotally movable magazine for supporting a stack of records adjacent the turntable, means for releasing records from the magazine, a record carrier for moving a released record to the turntable, and a reversing device adapted to cooperate with said record carrier and said magazine for reversing a record on said turntable. The mechanism for pivotally moving the magazine comprises a power-driven cam wheel, means associated with the magazine including a member cooperating with the cam wheel in a predetermined manner during one revolution thereof for pivotally moving the magazine a predetermined distance, and means for effecting cooperation of said member with the cam wheel in a different predetermined manner during the next revolution of the cam wheel, for pivotally moving the magazine a different predetermined distance. The magazine is moved the first predetermined distance for cooperating with the record carrier in moving a released record to the turntable and is moved the second predetermined distance for cooperating with the record carrier and reversing device to reverse a record on the turntable.

For a better understanding of the invention, together with other and further objects thereof, reference is made to the following description taken in connection with the accompanying drawings, and its steps will be pointed out in the appended claims.

Figure 1:
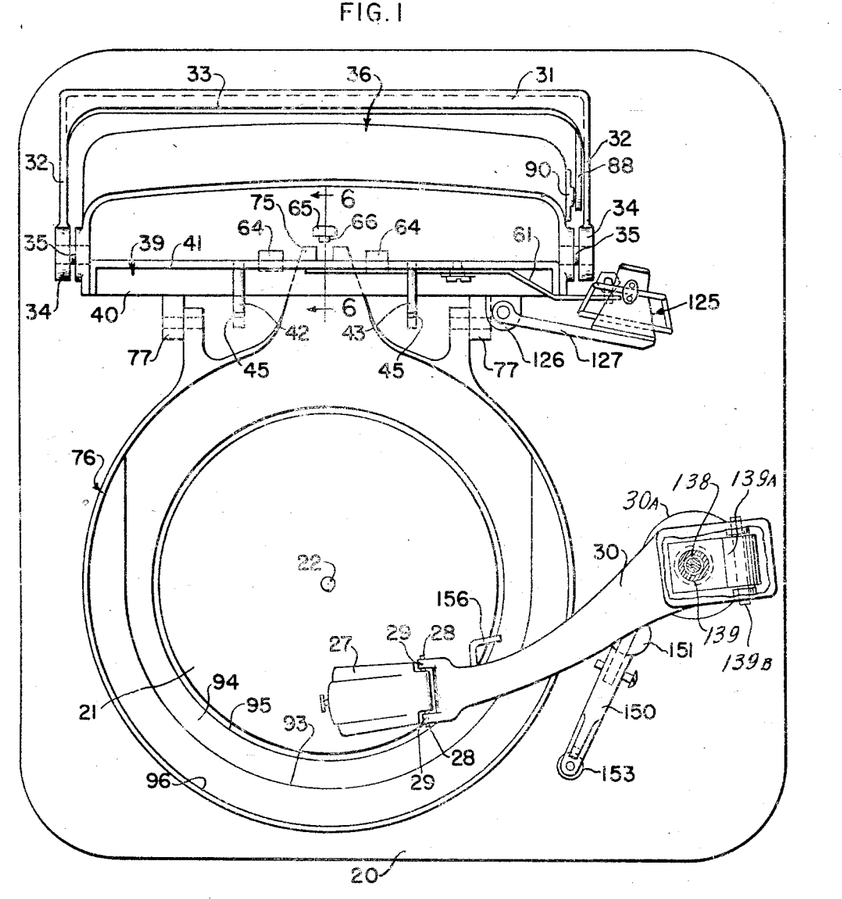
Fig. 1 is a top plan view of the record-changing apparatus.

Referring particularly to the drawings, the invention is here illustrated as having a base or supporting plate 20, as clearly shown in Fig. 1. Disposed above said base plate is a horizontally rotatable turntable 21 supported by a centering pin 22.

Figure 4:
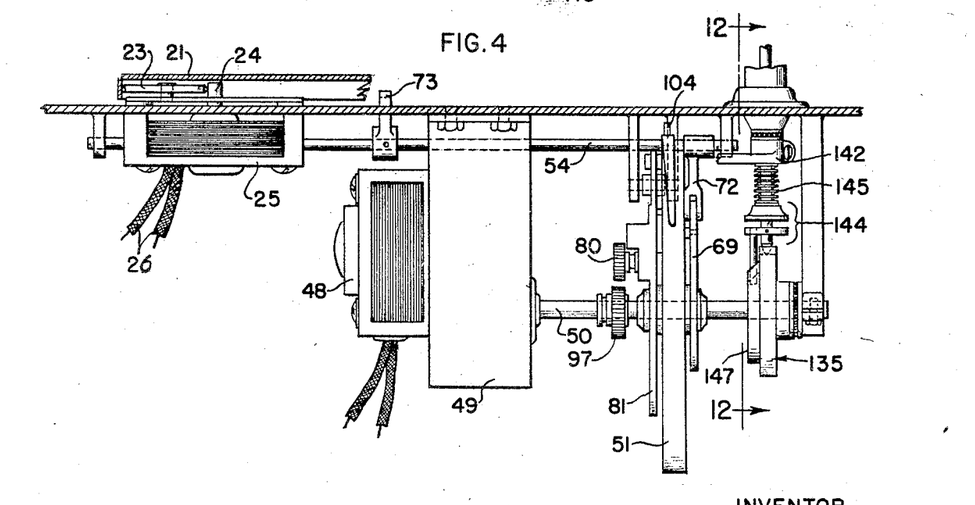
Fig. 4 is a front elevation view of the lower portion of the record-changing apparatus.

As shown in Fig. 4, the turntable 21 is driven by a friction wheel 23 shown to engage the rim of the turntable 21. The friction wheel 23 is operatively connected by means of a shaft 24 to an electric motor 25 to which current is supplied from a suitable source through the conductors 26.

A reproducer 27 (Fig. 1) is used for taking the recorded matter from the records on the turntable 21. The reproducer 27 is pivotally mounted for movement in a vertical plane on a pair of studs or other pivoting means 28 carried by bearing portions 29 provided on a pickup arm 30. The opposite end of said pickup arm is rotatably mounted on a pedestal 30A (Fig. 12) to permit the reproducer to move in a horizontal plane over a record on the turntable when the stylus of the reproducer 27 is in engagement with the record groove of said record. Means are provided for elevating the pickup arm 30 and swinging said pickup arm horizontally to position the stylus of said pickup arm for engagement with the initial groove of a record on the turntable. This means will be described in detail hereafter.

Figures 2, 7:
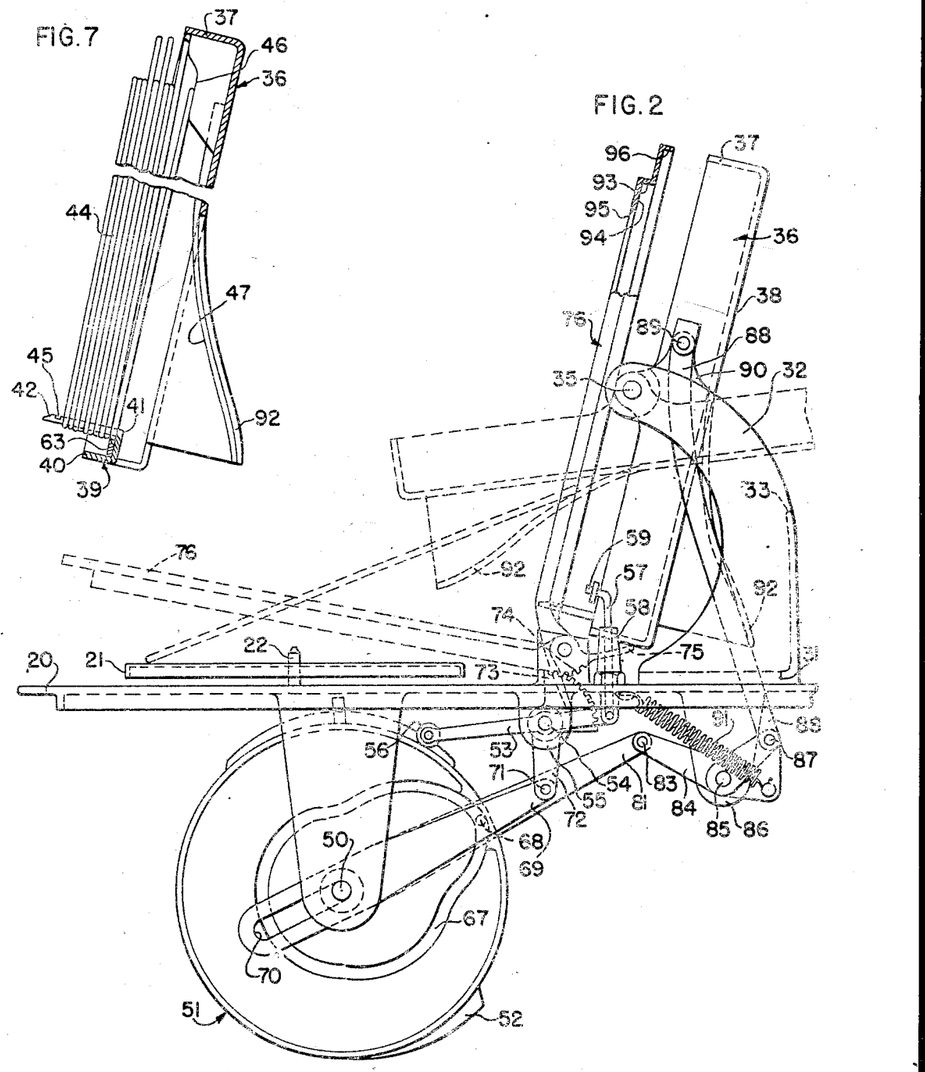
Fig. 2 is a side elevation view showing a partial assembly of the record-changing apparatus.
Fig. 7 is a vertical sectional view through the record magazine showing the location of the records therein.

Means are provided for supporting a plurality of records, including a bracket 31 (Fig. 5) fixedly secured to the base plate 20. The bracket 31 has a pair of upwardly curved spaced arms 32 connected and braced by a web 33. The enlarged ends of the arms 32 provide bearings 34 (Figs. 1 and 3) for short shafts or studs 35 of a record magazine or reservoir 36 (Figs. 1 and 2). The magazine 36 is pivotally mounted in the bearings 34 for a swinging movement between the solid line position and the dotted line position shown in Fig. 2 of the drawings.

The magazine 36 is so constructed as to receive a plurality of records which may be of various different diameters.

Figure 6:
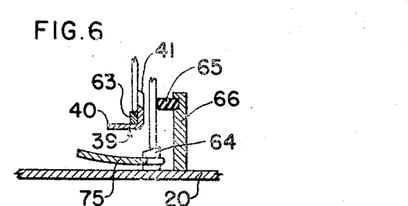
Fig. 6 is a fragmentary sectional view taken on line 6—6 of Fig. 1.

The magazine 36 includes a forwardly projecting flange 37 (Figs. 2 and 3), a back portion 38 and a lower crossbar 39 connecting the lower ends of the side portions of the flange 37. A sectional view of the crossbar 39 is shown in Figs. 6 and 7 of the drawings. It is apparent from these figures that this bar is angular in shape having a substantially horizontal portion 40 and a substantially vertical portion 41. Carried by the crossbar 39 at points equally spaced from the center, on the vertical portion 41, are a pair of forwardly projecting pins 42 and 43 (Fig. 1) disposed to engage the lower edges of records of a stack 44 to support the weight of the records in the magazine 36, as shown in Fig. 7. These pins may be notched near the ends at 45 to prevent the records from slipping off.

Figure 3:
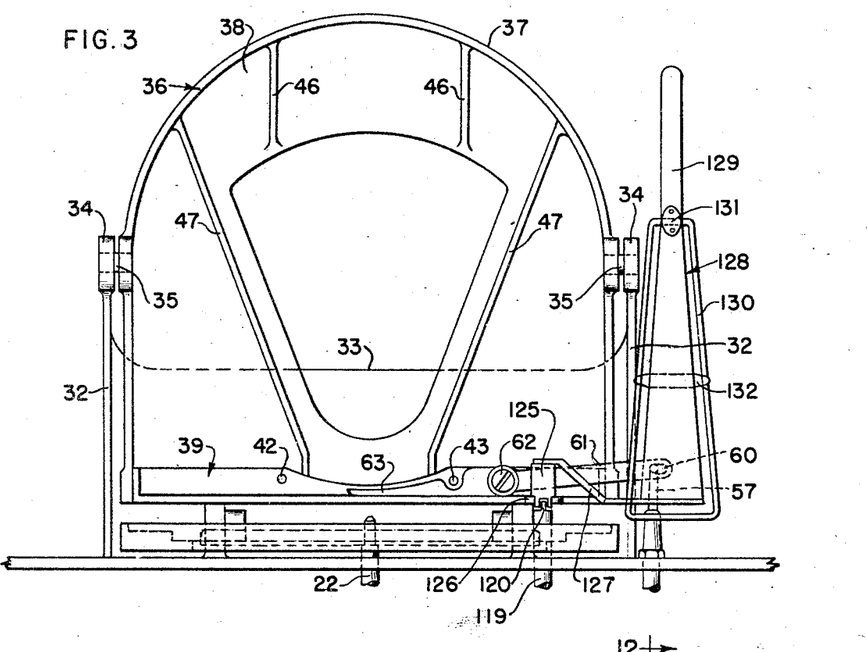
Fig. 3 is a front elevation view of the upper portion of the record-changing apparatus.

Formed on or secured to the back 38 of the magazine 36 are pairs or ribs 46 and 47 (Fig. 3). The rear record of the stack of records 44 will have its upper peripheral portion in engagement with the ribs 46 (Fig. 7) when the records are stored. The ribs 47 function in the transfer of a record from the magazine 36 to the turntable 21, as will be described hereafter.

Means are provided for transferring the supported records one at a time from the magazine 36 to the turntable 21. The first step in this operation is to separate a record from the stack of records 44 (Fig. 7). This requires the cooperation of an electric motor 48 and a gear box or speed reducing mechanism 49 which are disposed on the under side of the base plate 20, as shown in Fig. 4 of the drawings. The gear or driving mechanism is arranged to drive shaft 50.

Secured to the shaft 50 is a large cam wheel 51 having in its sides cam tracks or grooves to be described later, and having on its periphery a cam 52 shown in Fig. 2, for operating a mechanism to chop or remove a record from the magazine 36. A lever 53 is pivoted intermediate its ends on a shaft 54 which is carried by a bracket 55 depending from the underside of the base plate 20, Fig. 2. At one end, the lever 53 carries a roller 56 which is adapted to engage the cam 52 on the periphery of the cam wheel 51, when it is desired to feed a record from the magazine 36 to the turntable 21.

The opposite end of the lever 53 is pivotally connected to an upwardly extended rod 57 (Fig. 2) passing through the base plate 20 and through a guide 58 secured to the upper side of the base plate 20. At its upper end the rod 57 is bent forwardly and its forward portion 59 passes through an elongated opening 60 in a knife or chopping lever 61 shown in Fig. 3. This lever 61 is pivoted intermediate its ends as at 62, to the crossbar 39 of the magazine 36.

One end of the lever 61 (Fig. 3) extends between the supporting pins 42 and 43, and this end 63 of said lever lies closely against the vertical portion 41 of the crossbar 39 as shown in Figs. 6 and 7. The upper surface of the portion or end 63 of the lever 61 inclines downwardly toward the vertical portion 41 of member 39 as is best shown in Fig. 6. The center portion of the vertical leg 41 of the crossbar 39 is scooped out or cut away, as clearly shown in Fig. 3. The record in the magazine 36 which rests against the ribs 46 also rests on the portion 63 of the lever 61, and against the vertical portion 41 of the crossbar 39.

When the cam wheel 51 is rotated in the manner previously described, the cam 52 (Fig. 2) strikes the roller 56, causing the lever 53 to be rocked on its pivot 54 drawing downwardly on the rod 57, thus rocking the end 63 of the lever 61 upward. This movement of the lever 61 elevates the record resting on it and because of the incline of the upper face of the knife portion 63 and because of the cut-away portion of the crossbar 39, the record slides downwardly out of the magazine and lands with its lower edge resting on spaced cushioning pads or blocks 64 disposed on the base plate 20 shown in Figs. 1 and 6, and is held against rearward movement at its lower edge by a pad 65 on an upright 66.

The next step is to move the record from the cushioning pads or blocks 64 to the turntable 21. To accomplish this, the cam wheel 51 (Fig. 2) is provided with a cam groove 67 in which is disposed a pin 68 which is carried by an arm 69 slotted at its lower end as at 70, the slot receiving the shaft 50. At its upper end, the arm 69 is pivotally connected as at 71 to a lever 72 secured at its upper end to the shaft 54. Also secured to the shaft 54 is a segmental gear 73 spaced along the shaft 54 from the lever 72 as shown in Fig. 4, and having teeth in mesh with a segmental gear 74 formed on the under side of a rearwardly extended tongue or projection 75 of a record carrying and guiding means or pan 76, as shown in Fig. 2.

The pan 76 (Fig. 1) is pivotally mounted on brackets 77 projecting upwardly from the base plate 20 and is adapted to swing through an arc from the full line position of Fig. 2 to the dotted line position, and then to a position surrounding and below the turntable 21. When a record has been released from the magazine onto the cushioning pads 64, the rearwardly extended tongue or projection 75 of the pan 76 is disposed below these pads 64. As the pan 76 is swung downwardly on its pivots 77 toward the dotted line position by the segmental gear 73 which is driven in a manner previously described, the tongue or projection 75 swings upwardly between the pads 64, and engages the lower edge of the released record and elevates it.

As the pan 76 moves downwardly in cooperating to move the released record to the turntable, the magazine 36 is swung in the bearings 34 through an arc from the full line position shown by Fig. 2 to the dotted line position shown by the same figure. For the purpose of swinging the magazine through the arc, the cam wheel 51 is provided with a cam groove 78 (Figs. 8 and 9) in which a pin 79 is adapted to operate. The pin 79 is affixed to a gear 80 and is movable in a path concentric to the axis of the gear 80. The gear 80 is mounted on a beam 81 and is adapted to move independently of the beam 81. When the cam 51 is rotating and the pin 79 is following the cam groove 78, the magazine 36 is pivoted to cooperate in moving a new record to the turntable.

Movement of the cam wheel 51 produces a sliding movement to the beam 81. This beam is provided with an elongated opening 82 through which the shaft 50 passes. At its upper end the beam 81 is pivotally connected as at 83 (Fig. 2) to an arm of a bell-crank lever 84 pivoted as at 85 on a bracket 86 depending from the underside of the base plate 20. The opposite end of the bell-crank lever 84 is pivotally connected as at 87 to a link 88 which is pivotally connected at its upper end as at 89 to a bracket 90 fixedly secured to the magazine 36 (Figs. 1 and 2). Referring to Figs. 1 and 2, it will be apparent that the bracket 90 is disposed on the magazine 36 rearwardly of the pivot studs 35, and that when the beam 81 is moved upwardly by engagement of the pin 79 in the cam groove 78, the bell-crank lever 84 will be rocked in a clockwise direction with the aid of the tension of a spring 91. The spring 91 preferably is affixed to the base plate 20 and the lever 84 in a suitable manner so that, when the magazine 36 is in the full-line position shown in Fig. 2, the spring 91 is under tension. As the bell-crank lever rotates, it will operate through the link 88 and rock the magazine 36 from the full line position of Fig. 2 to its dotted line position in that figure.

From the foregoing it will be apparent that the magazine 36 is swung pivotally after the extension 75 of the pan 76 (Fig. 2) has engaged and moved the new record from the pads 64. The rear portion or back 38 of the magazine 36 flares outwardly as at 92 (Figs. 2 and 7). The upper portion of the released record is, of course, in contact with the back 38 of the magazine before it is moved to the turntable.

As the pan 76 moves downwardly on its pivots in the manner previously described, the record slides forwardly on the pan 76. The movement of the magazine 36 assists the forward movement of the record, one edge of which is elevated and resting against said magazine and the other edge of which extends through the pan 76, engaging and sliding across the surface of the turntable. During this record-changing process the turntable rotates, but the record is held from lateral movement by the inner edge of the pan 76.

If a 10-inch record is being placed on the turntable, its forward edge will engage against a vertical wall 93 of the pan 76 (Figs. 1 and 2), and its forward movement will be stopped. Now, as the cam wheel 51 continues to rotate with the shaft 50, having completed one-half of a revolution, the pin 79, in following the cam track 78, will cause the beam 81 (Fig. 2) to move downwardly, and in moving cause the bell-crank lever 84 to move in a counterclockwise direction, thus developing tension in the tension spring 91. As the bell-crank lever 84 moves, the link 88 moves the magazine 36 back to its full line position, shown in Fig. 2. As the magazine 36 swings back to the latter position, the rear edge of the record is gradually lowered into a properly centered position on the turntable 21.

It is to be noted that the edge of the record first comes into engagement with the turntable on the opposite side of the centering pin 22 so that the record is not hindered in its sliding movement. Further, the turntable is covered with a suitable material to permit sliding a record across it, but at the same time having sufficient traction so that a record maintains a fixed position when it is being played.

The pan 76 is designed to accommodate different sized records. With this in view, said pan is provided in one plane with annular portion 94 having a central opening defined by the line 95. Said central opening is of slightly greater diameter than the diameter of the turntable 21. This is apparent by referring to Fig. 1. The turntable is of less diameter than the smallest record to be played. The arc defined by the wall 93 has a radius slightly larger than the radius of a 10-inch record.

When a 12-inch record is released from the magazine 36, and is moved into playing position upon the turntable, in the same manner as previously described for a 10-inch record, it jumps over the wall 93, owing to its large diameter, and its forward edge contacts a wall 96 of the pan 76 (Figs. 1 and 2). The inner circumference of the wall 96 has a radius slightly larger than the radius of a 12-inch record. This wall 96 limits the forward movement of a 12-inch record, and as the magazine is swung back to the full line position of Fig. 2, in the same manner as previously described, the 12-inch record is let down and properly centered on the turntable 21.

After one side of a record on the turntable is played, means are provided for reversing the record so that its opposite side may be then played before it is returned to the magazine 36. To this end a segmental gear 97 is secured to the shaft 50 (Figs. 9 and 10), and is arranged to rotate the gear 80 180° during each revolution of the shaft 50. The gear 80 is held in its operative position on the beam 81 by a small spring-biased plunger 98 (Figs. 9 and 10) which travels in a groove 99 provided in the gear 80. A pair of notches 100 and 101 (Fig. 10), which are spaced 180° apart in the groove 99 of the gear 80 cooperate with the spring-biased plunger 98 for locking the gear 80 in two distinct positions. When the spring-biased plunger 98 engages the notch 100, the gear 80 is locked in position to cause the pin 79 to travel in the cam track 78 (Fig. 8) as the cam wheel 51 rotates to place a new record on the turntable, as previously described. When the spring-biased pin 98 engages the notch 101, the gear 80 is locked in position to cause the pin 79 to travel in the cam track 103 as the cam wheel 51 rotates to reverse a record on the turntable.

Now, during the first complete revolution of the shaft 50, when a new record is fed to the turntable, as previously described, the cam wheel 51 in rotating causes a pin 104 (Figs. 8 and 11), carried by the cam wheel 51, to engage and impart a partial rotation to a small star wheel 105 (Fig. 11) which is pivotally mounted on the under side of the base plate 20.

Fixedly secured to the star wheel 105 are three equally spaced pins 106. These pins 106 are spaced as shown in Fig. 11 so as to engage a spring-biased lever 107 (see Fig. 11) during every other revolution of the cam wheel 51.

Figure 10:
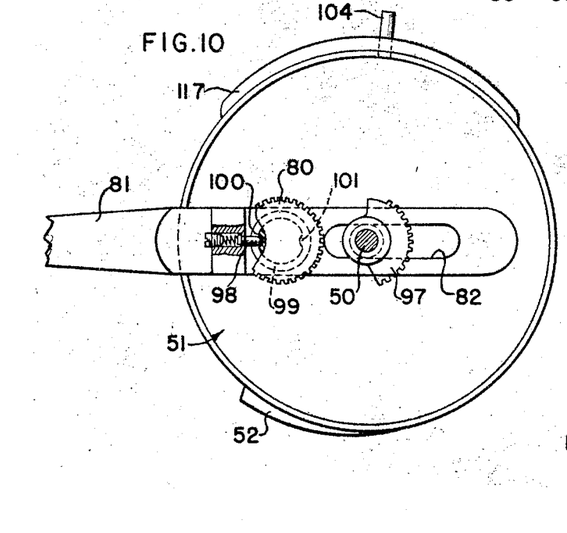
Fig. 10 is an elevation view of the parts shown in Fig. 9.
Figure 11:
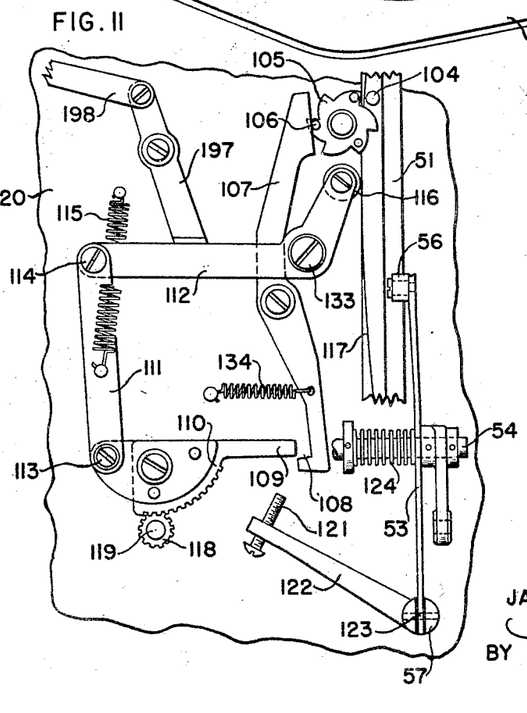
Fig. 11 is a fragmentary view showing the locking mechanism for the record-reversing member.

When the star wheel 105 is moved to the position shown in Fig. 11, the spring-biased lever 107 is moved in a counterclockwise direction sufficiently far to move a notched end 108 out of engagement of a finger 109 provided on a segmental gear 110. A connecting link 111 is pivotally connected to the segmental gear 110 and an L-shaped lever 112 as at 113 and 114, respectively. A spring 115, having one end anchored to the base plate 20 and the other end anchored to the link 111, tends to move the segmental gear 110 and the lever 112 in a clockwise direction. To prevent the members 110 and 112 from moving, a roller 116 is provided on the L-shaped lever 112, and this roller engages the side of a cam portion 117 provided on the cam wheel 51 (Figs. 10 and 11).

Figure 13:
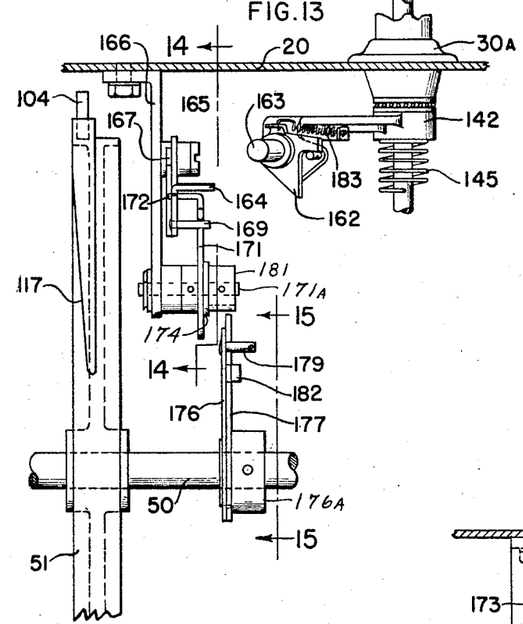
Fig. 13 is an elevation view showing the associated parts forming the tripping mechanism for initiating a record-changing cycle.

When the tripping mechanism has been actuated after one side of the record has been played and the cam wheel 51 begins to rotate, the roller 116 in traveling over the side of the cam portion 117, which tends to taper inwardly as shown in Figs. 11 and 13, allows the tension-spring 115 to move the segmental gear 110 and the lever 112 in a clockwise direction. The segmental gear 110 is in mesh with a pinion 118 secured on a shaft 119 extending through the base plate 20 and cut away at opposite sides to form a lug 120 (see Fig. 3).

As the segmental gear 110 rotates in the manner previously described, the finger 109 engages the end of a screw 121 secured to the end of an arm 122, which is pivotally supported on the lower end of the rod 57 (Fig. 2). As the arm 122 is moved by engagement of the finger 109 therewith, the rod 57 will be turned and likewise the lever 53. As shown in Fig. 11, the lever 53 is pivotally connected to the arm 122 as at 123, and is slidably mounted on the shaft 54 and held in normal position by a coil spring 124 (Fig. 11). When the shaft 57 is rotated in a counterclockwise direction, the lever 53 is pivoted therewith and slides on the shaft 54 to compress the spring 124. Such movement of the lever 53 will carry the roller 56 out of the path of the cam surface 52 on the cam wheel 51 so that the knife or chopping lever 61 will not be actuated to remove a record from the magazine 36 during the record-changing cycle of the cam wheel 51.

Above the base plate 20 the lug 120 of the shaft 119 enters a notch in the lower end of a stud 125 journaled in a bearing 126 (Figs. 1 and 3). The bearing 126 is provided on the lower part of the magazine 36 as shown in Fig. 3. To the upper end of the stud 125 is secured an arm 127 offset downwardly as shown in Fig. 3, and at its free end carrying a reversing member 128, including a flexible plate portion 129 and a spring frame member 130 connected with the flexible plate 129 as at 131, and also by a spring piece 132. At its lower end, the frame-like member 130 is free of the flexible plate 129 and normally sets forwardly thereof. The manner in which the reversing member is connected to the magazine 36 and the shaft 119 permits the reversing member 128 to move with the magazine 36 when the reversing member 128 is pivoted by the shaft 119.

Figure 5:
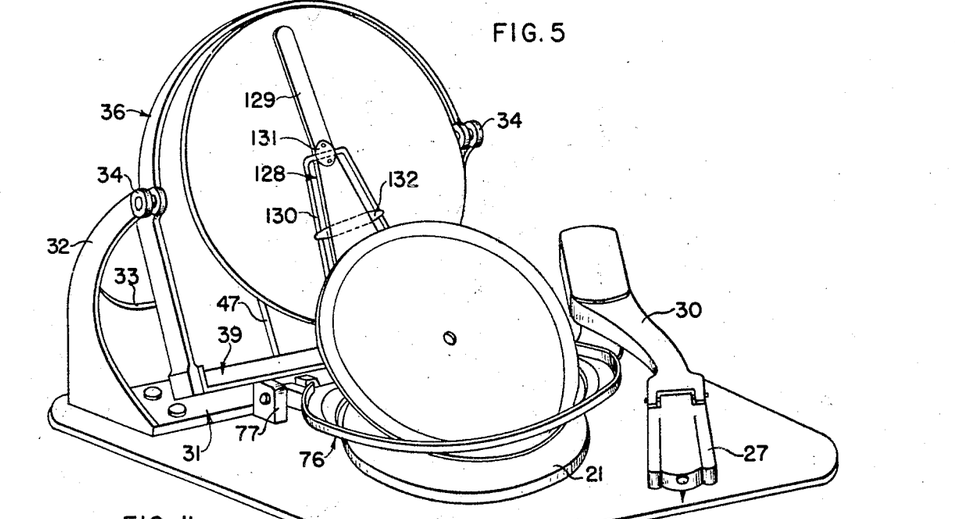
Fig. 5 is a perspective view of the upper portion of the record-changing apparatus shown in the act of reversing a record.

When the segmental gear 110 is rotated as previously described, and rotates the pinion 118 and the shaft 119, the reversing member 128 will be swung from a position on one side of the magazine, as shown in Fig. 3, to a position in front of the magazine, in which position it slopes rearwardly, as shown in Fig. 5 and is adapted to move with the magazine 36 when the magazine is pivoted. Now, as the cam wheel 51 rotates, the beam 69 is moved upwardly in the manner previously described and in moving it rotates the segmental gear 73 which acts through the gear portion 74 to rock the pan 76 from the position adjacent to the turntable, to the solid line position in Fig. 2. As the pan 76 acts to return a record to the magazine 36 in this manner, the record will be disposed against the reversing member 128, which will prevent the record from entering on the pins 42 and 43 of the magazine 36. When the pan 76 is again lowered, it permits the record resting against the reversing member 128 to slide back on the turntable in a reverse position. The record is assisted in this sliding action by the pivotal movement of the magazine 36 to which is affixed the reversing member 128.

After the record has been returned to the turntable in reversed position, the reversing member 128 is swung back to its normal position on the side of the magazine 36. To accomplish this, the cam portion 117 of the cam wheel engages the roller 116 on the lever 112. As the cam wheel 51 continues to revolve, the lever 112 is moved in a counterclockwise direction on its pivot 133. This movement of the lever 112 moves the link 111 downwardly against the biasing action of the spring 115, causing the segmental gear 110 to move in a counterclockwise direction. The counterclockwise movement of the segmental gear 110 rotates in a clockwise direction the pinion 118 and the shaft 119 which, in turn, swing the arm 127 and member 128 outwardly. Immediately thereafter the cam wheel 51 has moved to where the pin 104 engages and moves the star wheel 105 sufficiently far to move the pin 106 out of engagement with the upper end of the lever 107 (Fig. 11), and permitting a tension-spring 134 to swing the lever 107 in a clockwise direction so as to cause the notched end 108 to engage the finger 109, locking the reversing member in the position shown in Fig. 3.

After the finger 109 has been moved away from the end of the screw 121, the tension spring 124 slides or moves the lever 53 back into the position shown in Fig. 11, to position the roller 56 into the path of the cam 52 on the periphery of the cam wheel 51.

While the cam wheel 51 is revolving to reverse the record in the manner previously described, the pin 79 in following the cam track 103 produces less upward movement of the beam 81 (Fig. 2). As the cam wheel 51 revolves and the record is reversed, the segmental gear 97 (Fig. 10) engages and rotates the gear 80 180° to swing the pin 79 from the position for following the cam track 103 to the position for following the cam track 78. This change in the position of the pin 79 takes place immediately after the cam wheel 51 has rotated to the position where the pin 79 leaves the cam track 103 and enters the cam track portion 102.

Figure 8:
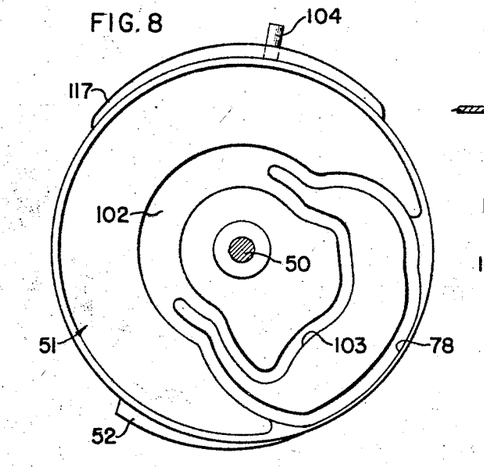
Fig. 8 is a view showing the side of the cam wheel with the continuous cam groove which controls the pivotal movement of the magazine.

It will be noted by referring to Fig. 8 that the cam track 103 is much shorter than cam track 78. The cam track 103 serves to swing the magazine 36 far enough to assist in placing a record on the turntable 21 in reversed position. The reason for the difference in the length of paths of cam tracks 78 and 103 is that when the new record is being placed upon the turntable, the magazine must move sufficiently far so that the record will be carried from the cushioning pads 64 into playing position upon the turntable 21, whereas when the record is being reversed, the record is moved only from the front of the magazine, or, more particularly, from the front of the reversing member 128 to playing position on the turntable.

Immediately after the record has been reversed, as previously described, the segmental gear 97 engages and rotates the gear 80 (Fig. 10) 180° to move the notch 101 out of engagement with the spring-biased pin 98 and to move this gear 80 to the position shown in Fig. 10. It will then be apparent that the parts will next act to pivotally move the magazine so that it will cooperate in moving a new record into playing position upon the turntable in the manner previously described. When the next record-changing cycle is initiated and the gear 80 is rotated 180°, while a new record is placed on the turntable, the mechanism will automatically be set for reversing the record when one side has been played. Owing to the pins 106 being located on every other point of the star wheel 105, Fig. 11, and the alternation of the position of the pin 79 on the gear 80, Fig. 9, the reversing mechanism is only brought into operation on each second revolution of the shaft 50.

When a record on the turntable has been completely played, the movement of the pickup arm 30 actuates a tripping mechanism, presently to be described in detail, and causes the electric driving motor 48 to start and to drive the speed reducing mechanism 49 and the drive shaft 50. The cam wheel 51, which is driven by the shaft 50, is thereupon driven through one complete revolution and comes to rest in the position shown in Figs. 2 and 4, and the driving motor 48 is shut off. As the cam wheel 51 begins to rotate, the pan 76, which is positioned below the record on the turntable, is raised to return the played record to the magazine 36. Immediately thereafter the lever 53 is actuated to release a new record from the magazine, and the beams 69 and 81 (Fig. 2) are moved upwardly. Thereupon, the pan 76 is moved in a counterclockwise direction (Fig. 2) and the magazine 36 is swung in a clockwise direction (Fig. 2). As a result, the new record moves from the magazine 36 to playing position on the turntable 21 in the manner heretofore described.

After a record is positioned on the turntable, the pickup arm 30 is swung to position the stylus at the beginning of said record. As will later be explained in detail, when the stylus of the pickup arm reaches the end of the record, the pickup arm is elevated and swung horizontally away from above the record. The elevating means controlling the pickup arm comprises a cam wheel 135 (see Figs. 4 and 12) having a cam surface 136 which has a notch or depressed portion 137 (Fig. 12), in which rests the lower end of a rod 138. This rod extends upwardly through a hollow shaft 139. The hollow shaft 139 has affixed to its upper end a plate 139A. At one end of the plate 139A there is provided a pin 139B to which is pivotally connected the pickup arm 30, as shown in Fig. 1. When the rod 138 is raised into engagement with the pickup arm 30, the pickup arm is pivoted in a vertical plane about the axis of the pin 139B to raise the stylus of the pickup arm out of engagement with the record on the turntable 21. The circumference of the cam wheel 135 tapers inwardly from the point 140 to the point 141.

Figure 12:
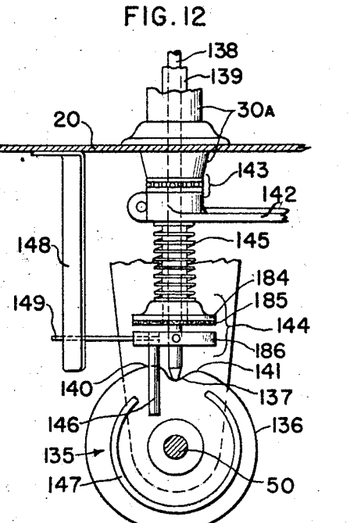
Fig. 12 is a view looking in the direction of the arrows of line 12—12 of Fig. 4, showing mechanism for moving the pickup arm in a horizontal plane and a vertical plane.

As shown in Fig. 12, a lever 142 is clamped on the shaft 139 below the pedestal 30A. A thrust bearing 143 is disposed between the arm 142 and the pedestal 30A to provide free movement of the arm 142. Disposed at the lower end of the shaft 139 and the rod 138 is a clutch 144, presently to be described in greater detail. Between the lever 142 and the clutch 144 is disposed a coil spring 145. The coil spring 145 surrounds the shaft 139 and obviously will be compressed when the clutch 144 is elevated. Secured to the clutch 144 is a depending pin 146 which lies in the path of movement of a second cam surface 147, as shown in Figs. 4 and 12.

After the record-changing and record-reversing mechanism has been tripped, the shaft 50 will being to rotate, as previously described. During the first part of the movement of said shaft, the cam wheel 135 affixed thereto will rotate, causing the cam surface 136 to raise the rod 138 out of the notch 137, bringing the elements of the clutch 144 together, compressing the spring 145. As the rod 138 reaches the high point 140 of the cam surface 136, the pickup arm 30 has been elevated, as has been previously described, to raise the stylus of the pickup arm 30 out of contact with the record on the turntable.

At this time the cam surface 147 engages the depending pin 146, forcing the pin to move in an arc in a horizontal plane. This movement of the pin 146, of course, is transmitted to the pickup arm 30 by the clutch 144, the shaft 139 and the plate 139A (see Figs. 1 and 12), swinging the pickup arm in a horizontal plane to a position beyond the edge of the record. A flat spring 148 (Fig. 12), depending below the base plate 20, extends into the path of movement of a pin 149 extending horizontally from the clutch 144. As the clutch 144 is rotated by the pin 146, which moves over the cam surface 147, as previously described, the pin 149 engages the flat spring 148. After the lever 149 comes into engagement with the spring 148, the speed of the movement of the pin 149 is retarded by the resistance of the spring 148. This resistance prevents the pickup arm 30 from being thrown outward with a sudden uncontrolled movement, and results in the pickup arm being given a steady outward movement.

It, of course, will be understood that the cam wheel 135 is continually turning. As the pin 146 travels over the cam surface 147, the pickup arm 30 is held in its outermost position through the cooperation of the clutch 144 and the shaft 139. When the pin 146 reaches the end of the cam surface 147, the tension of the flat spring 148 acting through the pin 149 gradually turns the clutch 144, and returns the pin 146 back to its normal position. During this latter movement of the clutch 144, the pickup arm 30 is, of course, swinging inwardly to bring the reproducer 27 to the beginning of the record.

As the lower end of the rod 138 reaches the high point 140 on the cam wheel 136, the pickup arm begins to descend. This, of course, lessens the tension of the spring 145 and allows the flat spring 148 to swing the pickup arm 30 inwardly, as previously described.

Means are provided for engaging the edge of a 12-inch record on the turntable to limit the inward movement of the pickup arm 30 under the action of the leaf-spring 148. The continual descent of the rod 138 (Fig. 12), previously described, moves the pickup arm 30 downwardly until it disengages the pickup arm stop presently to be described, so that the action of the spring 148 on the pickup arm is discontinued shortly after the stopping means for the pickup arm engages the edge of the record.

Figure 16:
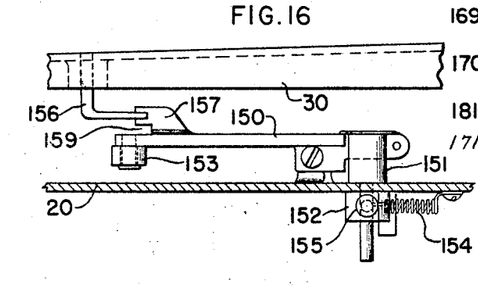
Figs. 16 and 17 are elevation views showing the mechanism for automatically controlling the positioning of the pickup arm at the beginning of different sized records.
Figure 17:
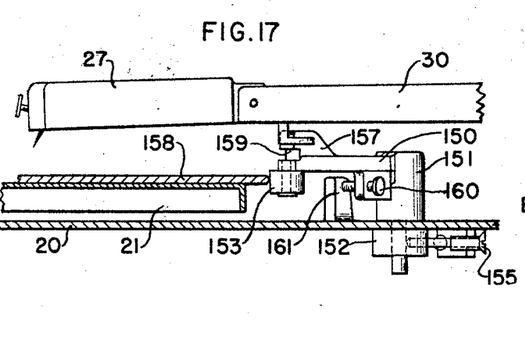

The stop for engaging the edge of the record and limiting the inward movement of the pickup arm under the influence of the flat spring 148 is shown in detail in Figs. 1, 16 and 17. This means includes an arm 150 (Fig. 16) which is affixed to a support 151 to rotate therewith in a horizontal plane. At the free end of the arm 150 there is provided a small roller 153 which is arranged to be moved into engagement with the peripheral edge of a 12-inch record on the turntable 21. The support 151 is mounted to rotate on a bearing surface provided on the base plate 20. A part of the support 151 extending below the top surface of the base plate 20 is reduced in cross section as shown in Figs. 16 and 17. An annular member 152 is affixed in a suitable manner preferably by screw 155 to the reduced portion of the support 151 to rotate therewith. A spring 154 is affixed to the annular member 152 and to some suitable fixed object such as the base plate 20. When in normal position, the spring 154 maintains the arm 150 in the position shown in Fig. 1. The arm 150 is actuated against the biasing action of the spring 154 by an L-shaped lever 156. The lever 156 is fixed to the pickup arm 30 and moves therewith.

When the cam wheel 135 acts to elevate the pickup arm 30 and swing it horizontally away from above the record, as previously described, the member 156 is raised sufficiently to pass above a boss 157 on the arm 150. As the cam wheel 135 continues to rotate and the pickup arm 30 is swung inwardly as heretofore described, the arm 30 is lowered sufficiently, due to the contour of the cam surface 136, to cause the member 156 on the pickup arm 30 to engage the side of the boss 157 provided on the arm 150, as illustrated in Fig. 16. Continued movement of the pickup arm 30 results in movement of the arm 150 against the biasing action of the spring 154. When the pickup arm 30 has been swung inwardly a sufficient distance, the roller 153 will engage the edge of a 12-inch record 158, as illustrated in Fig. 17.

When the stop or roller 153 engages the edge of a 12-inch record 158, the rod 138 has reached the point 141 on the cam surface 136 (Fig. 12). As the rod 138 moves downwardly into the notch 137, the pickup arm 30 is lowered to bring the stylus into engagement with the beginning of the record and the member 156 is moved into a notch 159 provided in the free end of the arm 150. When this occurs, the arm 150 is moved away from the edge of the record by its biasing spring 154 to the position shown in Fig. 1.

When a 10-inch record is in playing position on the turntable, the arm 150, in moving inwardly under the action of the pickup arm 30, as previously described, causes an adjusting screw 160 provided on the arm 150 (Fig. 17) to engage a stop 161 provided on the base plate 20. The engagement of the elements 160 and 161 takes place at a time when the stylus of the pickup 27 is over the starting groove of a 10-inch record on the turntable. Continued movement of the cam wheel 135 causes the stylus of the pickup arm to be lowered into engagement with the record and at the same time moving the extension or member 156 into the notch 159 of the lever 150, thus allowing the spring 154 to move the lever 150 outwardly in the manner previously described.

From the above, it will, of course, be understood that when a 12-inch record is in playing position on the turntable, the stylus of the pickup arm is stopped over the beginning of said record by the engagement of the roller 153 with the periphery of said record. Whereas, when a 10-inch record is in playing position on the turntable, it is the engagement of the screw 160 with the stop 161 which positions the stylus of the pickup arm over the beginning of said record.

The automatic record-changing or record-reversing cycle is actuated by the automatic tripping mechanism, previously mentioned, which will now be described in greater detail. The pickup arm 30, which has been lowered to engage the stylus with the initial groove of the record on the turntable, is moved inwardly by the stylus following the spiral groove on the record. In moving toward the center of the record, the pickup arm moves with it the hollow shaft 139 and the arm 142.

Referring particularly to Fig. 13, the arm 142 is shown to support a spring-biased member 162 and a pin 163. As reproduction goes on and the pickup arm 30 moves toward the center of the record, said pickup arm moves with it the arm 142 to which is attached said spring-biased member. The member 162 engages the serrated surface of a turned-over portion 164 provided on a pivoted lever 165 (Figs. 13 and 14), which is pivotally supported by a bracket 166 secured to the underside of the base plate 20. As the stylus of the pickup arm advances toward the center of the record, the member 162 advances notch by notch on the ratchet surface of the portion 164.

Figure 14:
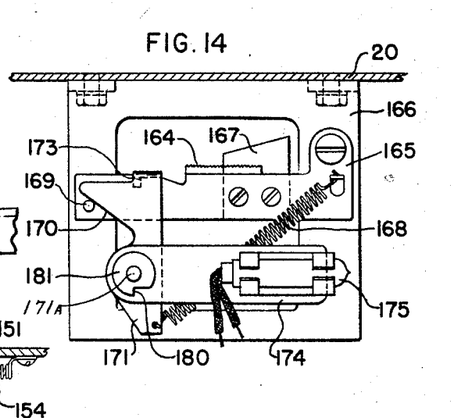
Fig. 14 is an assembly view showing the switch of the tripping mechanism as viewed from line 14—14 of Fig. 13.

As the stylus approaches the inner groove of the record, the pin 163 on the arm 142 engages a tapered member 167 provided on the lever 165 (Fig. 14). As the stylus moves inwardly, the pin 163, in traveling over the tapered surface of member 167, tends to move the member 167 and therewith the lever 165 downwardly or in a counterclockwise direction against the biasing action of a spring 168 (Fig. 14).

As illustrated in Fig. 14, the free end of the lever 165 supports a pin 169, which engages a tapered ear 170 provided on a lever 171. The lever 171 is pivotally mounted on a shaft 171A which is fixed to the bracket 166 as shown in Figs. 13 and 14. The upper end of the lever 171 is bent over at 172, as shown in Fig. 13, so as to engage a notch 173 provided near the free end of the lever 165. When the stylus of the reproducer moves into the spiral groove customarily provided as the inner groove of the record, the pin 163 is moved along the tapered edge of the member 167 sufficiently far to move the lever 165 downwardly sufficiently to allow the notch 173 to move out of engagement with the turned-over end 172 of the lever 171. When this occurs, the tension spring 168 which is connected to the levers 165 and 171, as illustrated, moves the lever 171 in a counterclockwise direction. This movement of the lever 171 causes the tapered ear 170 to move the pin 169 and therewith the free end of the lever 165 downwardly. A lever 174, which is arranged to move with the lever 171, is likewise moved in a counterclockwise direction. As the lever 174 swings in a counterclockwise direction, a mercury switch 175, supported on the free end of the lever 174, is moved into an angular position, thus closing the switch and starting the motor 48 (Fig. 4) and thus actuating the record-changing mechanism.

Figure 15:
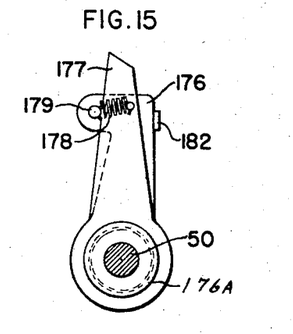
Fig. 15 is a view taken on line 15—15 of Fig. 13, showing the member for setting the tripping mechanism.

As appears in Figs. 13 and 15, an arm 176 is fixedly secured to the reduced portion of the member 176A which is affixed in a suitable manner to rotate with the drive shaft 50. A member 177 also is mounted on the reduced portion of the member 176A and is free to rotate about the axis of the shaft 50. A spring 178 connects the members 176 and 177 as shown in Fig. 15 and normally maintains the lever 177 in engagement with a pin 179 on the member 176. The member 177 is adapted to be moved against the tension of the spring 178 and into engagement with an ear 182. As the shaft 50 rotates to position a new record on the turntable or to reverse a record in the manner previously described, the arm 176 likewise rotates with the shaft 50. Near the end of the record-moving operation the upper end of the spring-biased member 177 engages a notch 180 of a member 181 to move the member 181 and the levers 171 and 174 in a clockwise direction to the position shown in Fig. 14. The member 181 is fixed in a suitable manner to the shaft 171A to rotate therewith. When the member 177 moves the member 181 in a clockwise direction and therewith the shaft 171A, levers 171 and 174, which are also fixed to the shaft 171A, also are moved in a clockwise direction. The clockwise movement of the lever 171 causes the spring 168 to swing the lever 165 upwardly in a clockwise direction. The clockwise movement of the lever 165 brings the notch 173 thereof into engagement with the turned-over end 172 of the lever 171 and locks the lever 171 in the position shown in Fig. 14. The clockwise movement of the lever 174 with the shaft 171A moves the mercury switch 175 to open the circuit including the motor 29. After the lever 171 is locked and the switch 175 is open, the lever 177 is moved out of engagement with the notch 180 of the member 181 by the spring 178 and the shaft 50 comes to rest.

It is to be pointed out that in case the inner groove of the record is an eccentric groove instead of a spiral groove, the pin 163 on the arm 142 may be swung away from the member 167 (Fig. 14) and not trip the mechanism as previously described. To insure that the mechanism will trip when the pickup arm 30 receives a reverse movement by an eccentric groove, the member 162, which is biased by a spring 183 into engagement with the serrated portion or rack 164, will move the lever 165 downwardly, wherein the tripping mechanism will be actuated and the record-changing cycle will be initiated the same as heretofore described.

The detailed construction of the clutch 144, previously referred to in connection with Fig. 12, will now be described. A flange 184 is associated with the hollow shaft 139 in such a manner as to be slidable thereon and rotatable therewith. A suitable fiber washer 185 is affixed to the under side of the flange 184. A plate 186, to which are fixed the pins 146 and 149, is fixedly secured to the rod 138. When the needle of the pickup arm is in engagement with a record on the turntable the flange 184 and the washer 185 are maintained out of engaging relationship with the plate 186 in some suitable manner such as providing an ear on the shaft 139 to engage the washer 185.

When the tripping mechanism is actuated and the pickup arm 30 is elevated by the rotation of the cam wheel 135 in the manner previously described, the rod 138, in moving over the cam surface 136, moves the plate 186 into engagement with the fiber washer 185. When the lower end of the rod 138 reaches the high point 140 on the cam surface 136, the plate 186 has raised the washer 185 and flange 184 sufficiently to create a tension on the spring 145. The spring 145 maintains an even frictional engagement between the plate 186 and the fiber washer 185. As the cam wheel 135 continues to rotate, the cam surface 147 engages the pin 146, causing the pin 146, the plate 186, and the pin 149 to move in a horizontal plane. The pin 149 moves against the biasing action of the spring 148. Thus, through the frictional engagement between the fiber washer 185 and the plate 186, the shaft 139 is rotated to swing the pickup arm outwardly. Later, under the action of the spring 148 on the pin 149, the pickup arm is swung inwardly to position the stylus into engagement with the outermost groove of the record on the turntable.

When a 10-inch record is in playing position on the turntable, the plate 186 is moved out of engagement with the fiber washer 185 immediately after the pickup arm 30 is swung to a position over the outermost groove of a record on the turntable. When a 12-inch record is in playing position on the turntable, the pickup arm 30 is stopped on its inward movement to position the stylus over the outermost groove of said record, before the cam wheel 135 has rotated sufficiently far to allow the rod 138 to descend into the notch 137 to break the frictional engagement between the fiber washer 185 and the plate 186. However, as the cam wheel 135 continues to rotate, the tension spring 148, by means of the pin 149, rotates the plate 186. This is possible because of the frictional connection between the plate 186 and the fiber washer 185. The movement of the plate 186 returns the pin 146 to the position shown in Fig. 12. At this time the cam wheel has rotated to where the rod 138 descends into the notch 137 and the frictional engagement between the fiber washer 185 and the plate 186 is broken, and the stylus is lowered into engagement with the outermost groove of a record on the turntable.

Figure 18:
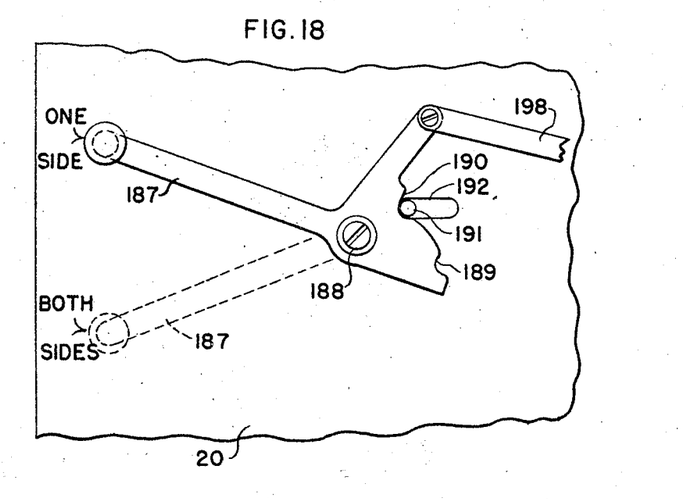
Fig. 18 is a fragmentary plan view showing part of the mechanism for manually setting the record-changing apparatus either to play one side or two sides of the records in the magazine.
Figure 19:
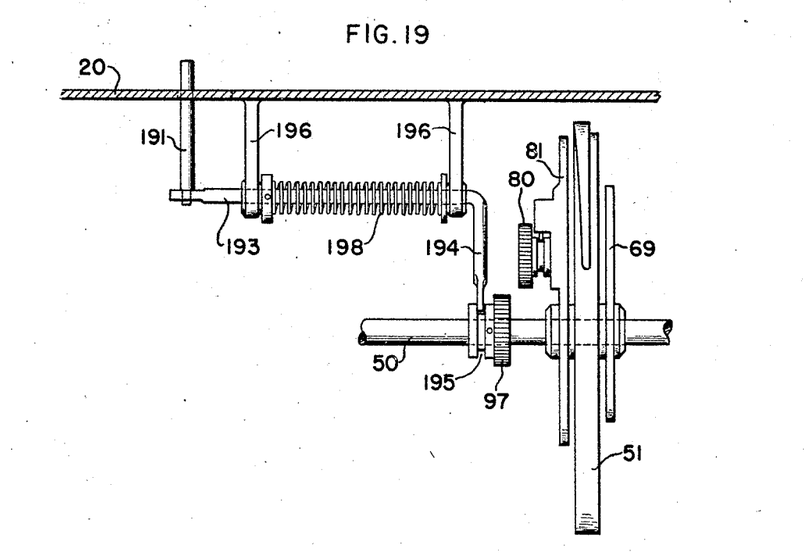
Fig. 19 is a fragmentary front elevation view showing another portion of the mechanism for manually setting the record-changing apparatus either to play one side or two sides of the records in the magazine.

An additional feature embodied in this record-changing mechanism is that the mechanism may be set to play automatically only one side of a record instead of both sides, after which a new record is moved into playing position upon the turntable in the manner previously described. This is accomplished by the movement of a lever 187 which is pivotally connected to the base plate 20 at 188 (Fig. 18). At one end of the lever 187 there is provided a pair of notches 189 and 190. These notches are arranged to engage a pin 191, which depends downwardly through an elongated aperture 192 in the base plate 20 and is secured to an L-shaped bar 193 (Fig. 19). The lever 193 is slidably mounted preferably in a pair of brackets 196 suspended from the bottom of the base plate 20. A toe 194 of the L-shaped bar 193 engages a groove 195 provided in the hub of the segmental gear 97. When the lever 187 is moved to the dotted line position in Fig. 18, the pin 191 is moved to engage the notch 189. The movement of pin 191 into the notch 189 moves the L-shaped bar 193 (Fig. 19) to the right to the pair of supporting brackets 196 sufficiently far to move the segmental gear 97 to the position shown in Figs. 4 and 9, wherein the segmental gear will engage and drive the gear 80, as previously described. The movement of the L-shaped lever 193 to the right is against the tension of the spring 198A which is supported by the lever 193 between the supports 196 and is connected to the lever 193 preferably by means of a flange member as shown in Fig. 19.

Now, when the lever 187 is manually moved to the solid line position in Fig. 18, a lever 198 which is pivotally connected to the lever 187 is moved to the right (Figs. 11 and 18). At the other end of the lever 198 there is pivotally connected one end of the lever 197 which is pivotally connected intermediate its ends to the base plate 20. The opposite end of the lever 197 is shaped in such a manner that it is adapted to be moved into engagement with the lever 112 to prevent its movement in a clockwise direction. The lever 197 is moved into stopping engagement with the lever 112 when the lever 198 is moved to the right (Figs. 11 and 18). The engagement of the levers 112 and 197 prevents the turnover member 128 (Fig. 3) from being moved to reverse a record, as previously described. Likewise, when the lever 187 is moved to the full line position shown in Fig. 18, the pin 191 is permitted to move, under the tension of the spring 198A, from engagement with the notch 189 to engagement with the notch 190. At the same time the tension of the spring 198A moves the lever 193 to the left (Fig. 19). When the lever 193 is moved to the left (Fig. 19) under the tension of the spring 198A, the toe 194 of the lever 193 moves the segmental gear 97 out of driving relationship with the gear 80. With the gears 97 and 80 out of driving relationship, the mechanism for reversing a record will not be put in operation. With the lever 187 in the full line position shown in Fig. 18, after one side of the record on the turntable is played, and the tripping mechanism is actuated in the manner previously described, the record will be returned to the magazine 36, without being returned, in a reverse position, to playing position on the turntable, and a new record will be removed from the magazine and placed in playing position upon the turntable, as heretofore described.

From the foregoing, it will be apparent that the mechanism may be manually set to play either one side or both sides of a record by merely moving the lever 187 to the desired position.

The general mode of operation of the record-changing apparatus will now be described. After a stack of records has been placed in the magazine 36, a master switch is closed to start both motors 25 and 48. The motor 25 rotates the turntable 21 and the motor 48 drives the shaft 50, to which is affixed the cam wheel 51.

The cam wheel 51, in rotating, causes the cam 52 to engage the roller 55, moving the lever 53 about its axis 54, moving the rod 57 downwardly, thereupon moving the lever 61 about its axis 62 sufficiently far to lift the rear record in the magazine 36 upwardly to release the record. The record then drops with the lower edge landing on the cushioned pads 64.

As the cam wheel 51 rotates, the beam 69 is moved upwardly by the pin 68 which follows the cam track 67 (Fig. 2). This upward movement of the beam 69, by means of the arm 72, causes the shaft 54 and therewith the segmental gear 73 to rotate. This rotating movement of the segmental gear 73, which engages the gear portion 74 provided on the pan 76, causes the pan 76 to swing downwardly. The pan 76, in moving, causes the extension 75 to move upwardly between the pads 64 to engage and lift the released record off of the pads 64.

Figure 9:
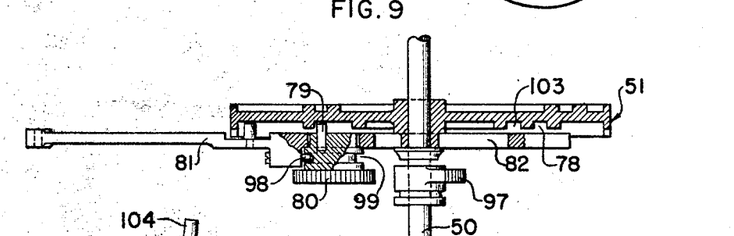
Fig. 9 is a sectional view of the cam wheel and its associated parts which cooperate in pivotally moving the magazine.

Continued movement of the cam wheel 51 causes the beam 81 (Fig. 2) to move upwardly as the pin 79 (Fig. 9) follows the cam track 78 (Figs. 8 and 9). This upward movement of the beam 81 causes the lever 84 to rotate in a clockwise direction, moving the link 88 downwardly and swinging the magazine 36 (Fig. 2) in a clockwise direction. When the magazine is swung forward, it cooperates with the pan 76 to cause a portion of the released record to slide along the turntable. Continued movement of the cam wheel 51 causes the pin 79, in following the cam track 78, to move the beam 81 downwardly, returning the magazine 36 to its normal position. The return movement of the magazine 36 permits the released record to drop into playing position upon the turntable.

Shortly thereafter, the pin 79 moves into the cam track portion 102. By this time the segmental gear 97 engages and rotates the gear 80 (Fig. 10) 180°, after which the locking pin 98 engages the notch 101. By this movement of the gear 80, the pin 79 is positioned to enter cam groove 103 on the next revolution of the cam wheel 51.

The cam wheel 135 has by this time rotated sufficiently far so that the spring 148, through the clutch 144, moves the pickup arm 30 inwardly to position the stylus over the outermost groove of a record on the turntable. Immediately thereafter, the rod 138 descends into the notch 137 of the cam wheel 135, moving the stylus into engagement with a record on the turntable and the driving motor 48 is automatically shut off, thus completing a record-changing cycle.

The record-reversing cycle takes place in the following manner:

When the stylus of the pickup arm 30 reaches the inner groove of a record being played, the tripping mechanism, including the arm 142 and the levers 155, 171 and 174 (Figs. 13 and 14) is actuated, whereby the mercury switch 175 is closed and the driving motor 48 is started.

As the cam wheel 135 rotates, the cam surface 136 (Fig. 12) moves the rod 138 upwardly and raises the pickup arm 30 out of engagement with the record. Continued movement of the cam wheel 135 causes the cam surface 147 to move the pin 146 and the clutch 144 to swing the pickup arm away from above the turntable.

Shortly thereafter, the cam wheel 51 rotates to where the roller 116 (Fig. 11), in moving over the cam surface 117, allows the tension spring 115 to move the lever 112 and the segmental gear 110 in a clockwise direction. The gear 110, in rotating, causes the finger 109 to engage and move the lever 122 in a counterclockwise direction, moving the lever 53 and therewith the roller 56 out of the path of the cam 52. The gear 110, in rotating, drives the gear 118 and turns the shaft 119 to swing the reversing member 128 from one side of the magazine 36 (Fig. 3) to a position in front of said magazine (Fig. 5).

As the cam wheel 51 continues to rotate, the beam 69 moves upwardly, swinging the pan 76 upwardly, placing the record against the reversing member 128 and then, as the beam 69 moves downwardly, said beam lowers the pan 76 to a position adjacent the turntable. The pin 79, in following the cam track 103, swings the magazine 36 outwardly sufficiently far so as to cooperate with the pan 76 and the reversing member 128 to return the reversed record to playing position on the turntable.

Immediately after the magazine 36 returns to its normal position, the segmental gear 97 engages and rotates the gear 80 180°, returning the pin 79 to a position to engage the cam track 78, during the next revolution of the cam wheel 51.

The cam wheel 51 has by this time rotated sufficiently far to cause the cam portion 117 to engage the roller 116 and move the lever 112 and the segmental gear 110 (Fig. 11) in a counter-clockwise direction. As the gear 110 rotates, the pinion gear 118 is rotated in a clockwise direction, turning the shaft 118 and swinging the reversing member 128 from in front of the magazine 36 (Fig. 5) to the position on the side of the magazine (Fig. 3). Likewise, this movement of the segmental gear 110 moves the finger 109 away from the end of the arm 122, permitting the spring 124 to move the lever 53 and the roller 56 to the position in Fig. 11, into the path of the cam 52.

Shortly thereafter, the cam wheel 135 starts to swing the pickup arm 30 inwardly. As the pickup arm swings inwardly, the member 156 engages and moves the lever 150 inwardly, until the roller 153 (if the record on the turntable is a large-sized record) engages the periphery of the record, and stops the pickup 27 over the beginning of the record. Continued movement of the cam wheel 135 lowers the rod 138 and the pickup arm 30 and brings the stylus of the reproducer 27 into engagement with the record.

Continued movement of the cam wheel 51 causes the pin 104 to engage and rotate the star wheel 105 (Fig. 11), disengaging the pin 106 and the lever 107, permitting the spring 134 to move the lever 107 in a clockwise direction, bringing the notch 108 into engagement with the finger 109 to lock the turnover member 128 in the position in Fig. 3.

The lever 176 has by this time rotated to where the member 177 engages the notch 180 in the member 181 of the tripping mechanism (Fig. 14). Continued movement of the member 177 swings the levers 171 and 174 in a clockwise direction, returning the mercury switch 175 to the position shown in Fig. 14, and the spring 168 thereupon swings the lever 165 upwardly to lock the tripping mechanism. Immediately thereafter, the motor 48 is shut off.

When both sides of the record are played, the tripping mechanism is again actuated, the pan 76 is swung upward to return the record to the magazine, and a new record is released from the magazine and another record-changing cycle heretofore described is initiated.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member operatively associated with said connecting means for cooperating with said first guiding means to move said magazine said first distance and for cooperating with said second guiding means to move said magazine said second distance, said member being rotatable relative to said connecting means after each of said movements of said magazine for changing the cooperative relationship between said member and said first and second guiding means; and an actuating member movable with said driving means for rotating said member after each of said movements of said magazine for changing the cooperative relationship between said member and said first and second guiding means.

2. In an automatic record-changing apparatus, the combination comprising a magazine movable first and second distances at different times; driving means movable through a cycle of operation for each of said movements of said magazine; first and second guiding means on said driving means having a common portion; connecting means operatively associated with said magazine; a member operatively associated with said connecting means for cooperating with said first guiding means to move said magazine said first distance and for cooperating with said second guiding means to move said magazine said second distance, said member being rotatable relative to said connecting means while said member is associated with said common portion for changing the cooperative relationship between said member and said first and second guiding means; and an actuating member movable with said driving means for rotating said member while it is associated with said common portion for changing the cooperative relationship between said member and said first and second guiding means.

3. In an automatic record-changing apparatus, the combination comprising a magazine movable first and second distances at different times; driving means movable through a cycle of operation for each of said movements of said magazine; first and second guiding means on said driving means having a common portion; connecting means operatively associated with said magazine; a member operatively associated with said connecting means for cooperating with said first guiding means to move said magazine said first distance and for cooperating with said second guiding means to move said magazine said second distance, said member being rotatable relative to said connecting means while said member is associated with said common portion for changing the cooperative relationship between said member and said first and second guiding means; resilient means on said connecting means for locking said member against rotation relative to said connecting means while said member is cooperating with said first or second guiding means; and an actuating member movable with said driving means for rotating said member while it is associated with said common portion for changing the cooperative relationship between said member and said first and second guiding means.

4. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member operatively associated with said connecting means for cooperating with said first guiding means to move said magazine said first distance and for cooperating with said second guiding means to move said magazine said second distance, said member being rotatable relative to said connecting means after each of said movements of said magazine for changing the cooperative relationship between said member and said first and second guiding means; an actuating member movable with said driving means and normally in an operative position for rotating said member after each of said movements of said magazine for changing the cooperative relationship between said member and said first and second guiding means, said actuating member being adapted to be moved out of said operative position; and means for moving said actuating member out of said operative position.

5. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member operatively associated with said connecting means and adapted to rotate relative thereto to first and second positions for cooperating with said first guiding means when said member is in said first position to move said magazine said first distance and for cooperating with said second guiding means when said member is in said second position to move said magazine said second distance; resilient means on said connecting means for locking said member in said first and second positions; and an actuating member movable about the axis of said driving means for rotating said member between said first and second positions after each of said movements of said magazine, whereby said member is brought into cooperative relationship alternately with said first and second guiding means.

6. In an automatic record-changing apparatus, the combination comprising a magazine movable first and second distances at different times; a driving member movable through a cycle of operation for each of said movements of said magazine; a guiding member movably connected to said driving member having first and second guiding paths; connecting means operatively associated with said magazine; a member operatively associated with said connecting means for cooperating with said first guiding path to move said magazine said first distance and for cooperating with said second guiding path to move said magazine said second distance, said member being rotatable relative to said connecting means after each of said movements of said magazine for changing the cooperative relationship between said member and said first and second guiding paths; and an actuating member movable about the axis of said driving member for rotating said member after each of said movements of said magazine for changing the cooperative relationship between said member and said first and second guiding paths.

7. In an automatic phonograph having a turntable, the combination comprising a driving means for carrying out a record-changing cycle and a record-reversing cycle; a record-releasing member movable by said driving means for carrying out a record-releasing operation, said record-releasing member being adapted to be moved into an inoperative position; an oscillatory member movable by said driving means for guiding a record during said record-changing cycle and said record-reversing cycle; a record-reversing member adapted to be moved into an operative position during said record-reversing cycle for cooperaitng with said oscillatory member for reversing a record on said turntable; and resilient actuating means associated with said driving means for being actuated during said record-reversing cycle for moving said record-releasing member into said inoperative position and moving said record-reversing member into said operative position.

8. In an automatic phonograph having a turntable, the combination comprising a driving means for carrying out a record-changing cycle and a record-reversing cycle; a record-releasing member movable by said driving means for carrying out a record-releasing operation, said record-releasing member being adapted to be moved into an inoperative position; an oscillatory member movable by said driving means for guiding a record during said record-changing cycle and said record-reversing cycle; a record-reversing member adapted to be moved into an operative position during said record-reversing cycle for cooperating with said oscillatory member for reversing a record on said turntable; resilient actuating means associated with said driving means for being actuated during said record-reversing cycle for moving said record-releasing member into said inoperative position and moving said record-reversing member into said operative position; and locking means operatively associated with said driving means to be actuated thereby during a record-changing cycle for locking said actuating means to prevent its operation during said record-changing cycle.

9. In an automatic phonograph having a turntable, the combination comprising a driving means for carrying out a record-changing cycle and a record-reversing cycle; first and second guiding means on said driving means; a movable magazine for supporting a plurality of records, said magazine being movable a first distance during said record-changing cycle and a second distance during said record-reversing cycle; connecting means operatively associated with said magazine; a member operaitvely associated with said connecting means for cooperating with said first guiding means to move said magazine said first distance and for cooperating with said second guiding means to move said magazine said second distance, said member being rotatable relative to said connecting means after each of said movements of said magazine for changing the cooperative relationship between said member and said first and second guiding means; a record-releasing member movable by said driving means for releasing a record from said magazine, said record-releasing member being adapted to be moved into an inoperative position; an oscillatory member movable by said driving means for guiding a record during said record-changing cycle and said record-reversing cycle; a record-reversing member adapted to be moved into an operative position during said record-reversing cycle for cooperating with said magazine and said oscillatory member for reversing a record on said turntable; an actuating member movable with said driving means and normally in an operative position for rotating said member after each of said movements of said magazine for changing the cooperative relationship between said member and said first and second guiding means, said actuating member being adapted to be moved out of its operative position; resilient actuating means associated with said driving means for being actuated during said record-reversing cycle for moving said record-releasing member into its inoperative position and moving said record-reversing member into its operative position; and movable means for preventing the reversing of a record and having a first element operatively associated with said actuating member and a second element operatively associated with said actuating means, the actuation of said means moving said first element for moving said actuating member out of its operative position and moving said second element into locking engagement with said actuating means.

JACKSON H. PRESSLEY.